UNITED STATES PATENT OFFICE.

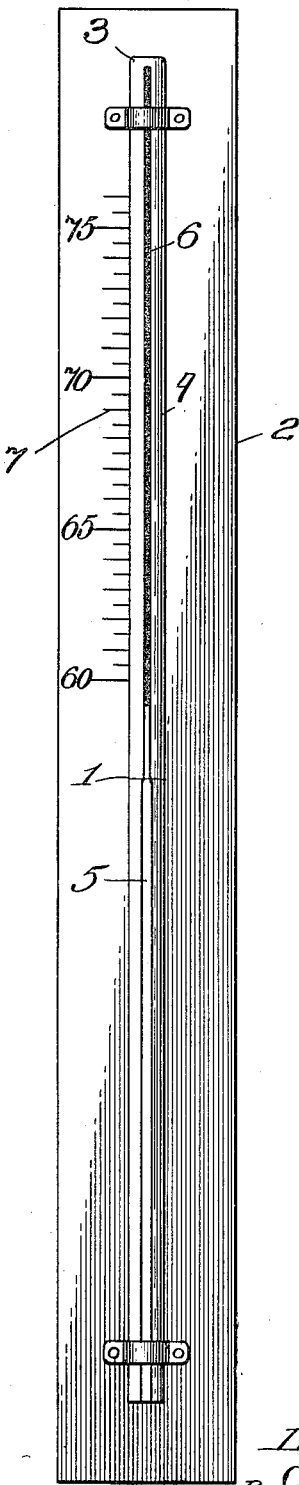

LAURENS HAMMOND, OF EVANSTON, ILLINOIS.

BAROMETER.

1,015,886.   Specification of Letters Patent.   Patented Jan. 30, 1912.

Application filed March 6, 1911. Serial No. 612,634.

*To all whom it may concern:*

Be it known that I, LAURENS HAMMOND, a citizen of the United States, residing at Evanston, in the county of Cook and State of Illinois, have invented a new and useful Improvement in Barometers, of which the following is a specification.

The object of my invention is to provide a construction of barometer which shall adapt its contained column of mercury to be sustained in the bore of the transparent tube by the pressure of the atmosphere entering the tube at its open lower end, thereby simplifying the device by avoiding all need of the use of a cistern and affording a material saving in the quantity of mercury required to be used.

My improved construction consists, broadly, in providing the transparent tube of proper length with its upper end closed to the atmosphere and its lower end open thereto and the bore of the tube, containing the mercury, of relatively greater diameter toward its open, lower end.

The accompanying drawing shows my improved barometer by a view in front elevation.

A preferably straight glass tube 1, supported on a suitable frame or holder 2, and the total length of which may be about one hundred and fifty centimeters, is closed or sealed at its upper end 3 and open at its lower end to the atmosphere. I prefer to construct the tube, which may be of the same external diameter throughout its length, of two longitudinal sections 4 and 5, joined end to end, the upper section 4 being the longer and about eighty centimeters in length, and the lower section 5 about seventy centimeters long. The bore in the upper section of the tube, containing the column of mercury 6, is of less diameter than that in the lower section, being about 1.9 mm. while that of the section 5 is about 2 mm. These proportions in the relative diameters of the two sections are best maintained whatever those diameters may be; but, of course, the diameter of the bore must not be so great that its surface tension will permit the mercury to fall out drop by drop.

By my improved construction of barometer, the atmospheric pressure exerted through the lower end of the tube supports the column of mercury. In the heavier condition of the atmosphere the column will be longer, and with rarer conditions of the atmosphere the column will fall and spread in the wider tube-section 5, thereby shortening its length to that which the atmosphere will sustain in its condition.

On the holder 4 is provided a scale 7 to enable the upper end of the mercury-column in shortening to indicate the barometrical measurements upon it.

What I claim as new and desire to secure by Letters Patent, is—

A barometer comprising a transparent tube containing a column of mercury and extending longitudinally in the same direction from end to end, said tube comprising an upper section hermetically closed at its upper end and having its bore of uniform diameter throughout, and a lower section open at its lower end to the atmosphere and having its bore of a diameter uniform throughout but greater than that of the bore of the upper section.

LAURENS HAMMOND.

In presence of—
 A. U. THORIEN,
 R. A. SCHAEFER.